US009648347B1

(12) United States Patent
Cheng et al.

(10) Patent No.: US 9,648,347 B1
(45) Date of Patent: May 9, 2017

(54) DISPARITY POSTPROCESSING AND INTERPOLATION FOR MOTION ESTIMATION AND MOTION CORRECTION

(75) Inventors: Guohua Cheng, Shanghai (CN); Neil D. Woodall, Newport Beach, CA (US); James Zhou, San Jose, CA (US); Yue Ma, Pleasanton, CA (US)

(73) Assignee: PIXELWORKS, INC., Portland, OR (US)

( * ) Notice: Subject to any disclaimer, the term of this patent is extended or adjusted under 35 U.S.C. 154(b) by 581 days.

(21) Appl. No.: 13/523,677

(22) Filed: Jun. 14, 2012

(51) Int. Cl.
| | |
|---|---|
| *H04N 19/59* | (2014.01) |
| *H04N 19/51* | (2014.01) |
| *H04N 19/597* | (2014.01) |
| *H04N 13/02* | (2006.01) |
| *H04N 13/00* | (2006.01) |

(52) U.S. Cl.
CPC ......... *H04N 19/59* (2014.11); *H04N 13/0022* (2013.01); *H04N 19/51* (2014.11); *H04N 19/597* (2014.11); *G06T 2207/10021* (2013.01)

(58) Field of Classification Search
CPC ........... H04N 13/0018; H04N 13/0431; H04N 13/029; H04N 13/0055; H04N 19/00769; H04N 13/0029; G03B 35/00; G06T 7/0051; G06K 9/6202
USPC ........................ 348/699, 701, 43, 44, 46, 51
See application file for complete search history.

(56) References Cited

U.S. PATENT DOCUMENTS

| | | | | |
|---|---|---|---|---|
| 2004/0240725 A1* | 12/2004 | Xu | ........................... | G06K 9/32 382/154 |
| 2007/0104276 A1* | 5/2007 | Ha | ....................... | H04N 19/597 375/240.16 |
| 2007/0109409 A1* | 5/2007 | Yea | ......................... | H04N 7/181 348/153 |
| 2008/0219351 A1* | 9/2008 | Kim | ..................... | H04N 19/597 375/240.16 |
| 2009/0190662 A1* | 7/2009 | Park | ..................... | H04N 19/597 375/240.16 |
| 2010/0231593 A1* | 9/2010 | Zhou | ...................... | G06T 3/4007 345/428 |
| 2011/0025822 A1* | 2/2011 | Naske | ................ | H04N 13/0011 348/44 |
| 2011/0050853 A1* | 3/2011 | Zhang | .................. | H04N 13/026 348/44 |

(Continued)

OTHER PUBLICATIONS

Atzpadin et al., "Stereo Analysis by Hybrid Recursive Matching for Real-Time Immersive Video Conferencing", IEEE Transactions on Circuits and Systems for Video Technology, vol. 14, No. 3, Mar. 1, 2004, pp. 321-334.*

(Continued)

*Primary Examiner* — Jay Patel
*Assistant Examiner* — Marnie Matt
(74) *Attorney, Agent, or Firm* — Marger Johnson

(57) ABSTRACT

A method of generating new views for a multi-view display system includes receiving a block-based disparity estimate between left image data and right image data for a frame of image data at a processor, upscaling the block-based disparity estimate to a pixel-based disparity for each pixel in the image date, performing motion vector based disparity interpolation and image interpolation simultaneously to produce left and right side interpolated data, and generating at least one new view using left and right side interpolated data.

9 Claims, 5 Drawing Sheets

(56) References Cited

U.S. PATENT DOCUMENTS

| | | | |
|---|---|---|---|
| 2011/0176722 A1* | 7/2011 | Sizintsev | G06T 7/0022 |
| | | | 382/154 |
| 2011/0254921 A1* | 10/2011 | Pahalawatta | H04N 13/0029 |
| | | | 348/43 |
| 2012/0075436 A1* | 3/2012 | Chen | H04N 19/597 |
| | | | 348/51 |
| 2012/0114036 A1* | 5/2012 | Po | H04N 19/50 |
| | | | 375/240.12 |
| 2013/0147915 A1* | 6/2013 | Wiegand | H04N 13/0048 |
| | | | 348/43 |

OTHER PUBLICATIONS

Atzpadin et al., Stereo Analysis by Hybrid Recursive Matching for Real-Time Immersive Video Conferencing, Mar. 1, 2004, IEEE Transactions on Circuits and Systems for Video Technology, vol. 14, No. 3, pp. 321-334.*

Atzpadin et al., Stereo Analysis by Hybrid Recursive Matching for Real-Time Immersive Video Conferencing, IEEE Transactions on Circuits and Systems for Video Technology, vol. 14, No. 3, Mar. 1, 2004, pp. 321-334.).*

Atzpadin et al., Stereo Analysis by Hybrid Recursive Matching for Real-Time Immersive Video Conferencing, IEEE Transactions on Circuits and Systems for Video Technology, vol. 14, No. 3, Mar. 2004.*

* cited by examiner

DISPARITY POSTPROCESSING AND INTERPOLATION FOR MOTION ESTIMATION AND MOTION CORRECTION

BACKGROUND

With the rapid growth of three-dimensional (3D) television, next generation broadcast systems aim to provide natural viewing experience in true three dimensions. A true multi-view consists of a collection of multiple video representations of 3D scene captured by different cameras. The system needs large cameras and complicated coding and transmission systems. The level of processing required raises the cost of the system.

Disparity estimation involves estimating the displacement between the left-eye and right-eye images. Disparity estimation generally requires a high level of processing. Many approaches perform pixel by pixel estimation between the two images. This requires a lot of processing power and raises both the costs and the amount of time required to perform the processing.

It is possible to use techniques and pre-existing processing logic used for two-dimensional processing of images to generate disparity estimations between the two views at the block level and process the block level disparities to upscale the disparities to the pixel level for use in generating new views for a multi-view system.

DETAILED DESCRIPTION OF THE EMBODIMENTS

Figure 1:
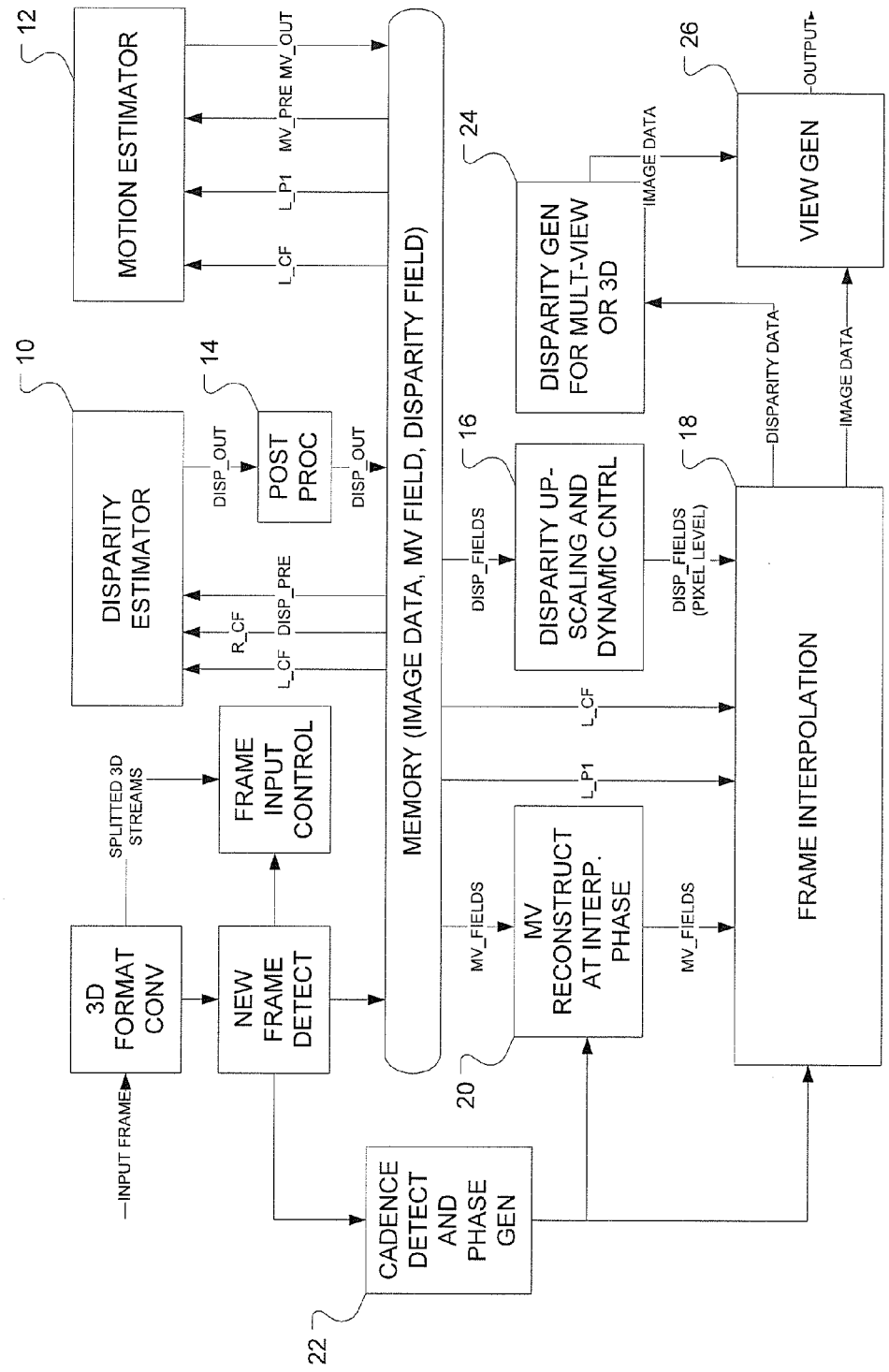
FIG. 1 shows a diagram of a disparity estimation and multi-view display system.

FIG. 1 shows a diagram of a disparity estimation and multi-view generation system. In the overview, a motion estimator 12 performs motion estimation between temporal frames and a disparity estimator 10 performs disparity estimation between the left view and the right view. The temporal frames are the previous frame P1 and the current frame CF, and the motion estimate results in a field of motion vectors, MV_OUT. The disparity estimator and the motion estimator share almost the same logic, because they both do block-based vector estimation.

To solve unstable issues introduced by the disparity estimator, the system provides post-processing at 14 and fallback operations for the disparity field according to the reliability of the disparity field. The instability results from small differences in content within a scene that cause huge differences in disparity estimation. The fallback operations allow for substitution of background or other disparity data in the place of faulty disparity data.

The process takes the block-based disparity estimation and upscales it to the pixel level at 16 and adjusts according to the statistics information from the disparity estimator 10. The system then performs disparity interpolation and frame interpolation at the phase of frame interpolation 18 according to the motion vectors in frame interpolation at 20. The phases are generated by the cadence detector and the phase generator 22. The frame interpolation 18 produces the disparity data for the disparity generator 24, and the interpolated disparity and the image data. The new interpolated frame and disparity are sent to view generation 26 to generate different views according to the specified phase.

To get a good disparity field for the disparity estimator 10, the process calculates possible disparity with horizontal and vertical shift by doing phase plane correlation between the left view and the right view. In one embodiment, the process limits the horizontal range to [−128, +128]. Some vertical shift will exist between the left and right image depending upon the source cameras for the left and right views, but will generally be limited here. The possible disparity candidates are sent to a hierarchical disparity estimator that performs disparity estimation at a down sampled resolution. Disparities with texture and a low sum of absolute differences (SAD) are considered reliable and are used to generate a histogram. The disparity estimation is then performed at the full resolution layer, using the histogram from the down sampled layer as a constraint. For those disparity candidates that do not exist in the histogram, a penalty for that disparity is increased for disparity selection, resulting in that disparity being disfavored.

To save costs, the disparity estimator may share most of the logic with the motion estimator and do block level estimation using the luminance (Y) component only. To compensate for brightness differences between the left and right views, the luminance difference is calculated between the left and right views with those blocks that have reliable disparity. The reliable disparity will typically have high texture and low SAD value in the down sampled layer. The luminance matching error according to the luminance difference in the full resolution layer is decreased. To measure the reliability of the disparity field, the process accumulates the block level SAD to get the frame level SAD sum. For those images that have low quality disparity, this value will be large and the SAD sum, SADSUM in FIG. 2, will be small for those with good disparity. This approach is set out in more detail in co-pending patent application Ser. No. 13/466,524, "Disparity Estimation Based on Reused Motion Vector Calculation," filed May 8, 2012.

Figure 2:
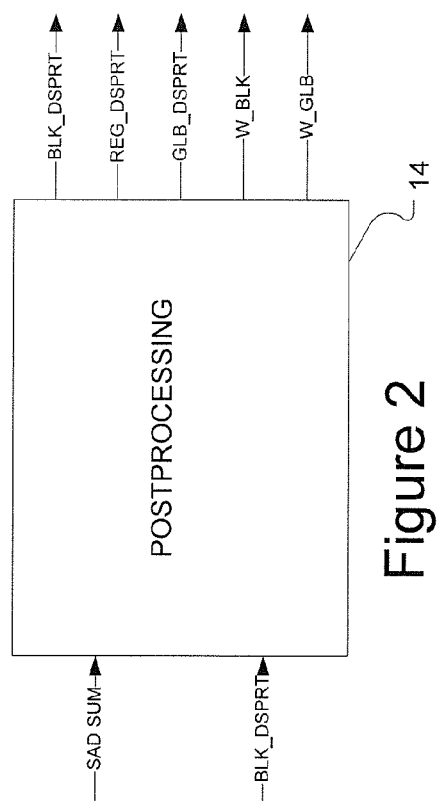
FIG. 2 shows a diagram of a post-processor.

After disparity estimation, a post-processor is added to smooth the block based disparity values as shown in FIG. 2. Other information, such as the regional disparity, global disparity, and fallback information, is also extracted here. Generally, only horizontal disparity is considered and vertical shift will not be considered here. Like motion estimation, disparity estimation may be unreliable for the smooth regions.

It is hard to get reliable disparity in the smooth region because it is always affected by a smoothness constraint in recursive processing. In the occluded regions, the process generally cannot find a matched block in the other view, either left or right, since the matched block is covered by the foreground. To solve the problem, a window of a predetermined size, such as a 5×5 block, is used in bilateral filtering. In the bilateral filtering, blocks with high texture and small SAD will get more weight. This allows the reliable disparity to spread to the unstable region and spreads disparity of texture region to the smooth region to reduce geometric distortion, and makes the disparity more stable since the smooth region disparity is very unstable. The spatial weight is programmable in the horizontal and vertical direction.

When the frame level SADSUM value is very large, using the wrong disparity will make the view generation results unacceptable. Larger low pass filtering is needed to make the disparity smoother when SADSUM is large. For the regional disparity, the frame is divided into regions, such as 8×8 regions, and then the disparity for each region is calculated. At the same time, the global average disparity is calculated. The different kinds of disparities, including block level, region level and global level, is sent to the disparity upscaling 16 from FIG. 1. The weight for each one will be determined by the frame level SADSUM. The global disparity is unreliable when the SADSUM is very large, so the process can decrease global disparity and make it close to zero when the SADSUM is very large.

The disparity calculated in the disparity estimator is block based, so up-scaling is needed at 16 to convert it to pixel based disparity. It is then sent to frame interpolation 18 in FIG. 1. In the up-scaling module, the block based disparity, region based disparity and global disparity is up-scaled. The weight from the disparity post-processor 14 is used to blend them together.

Figure 3:
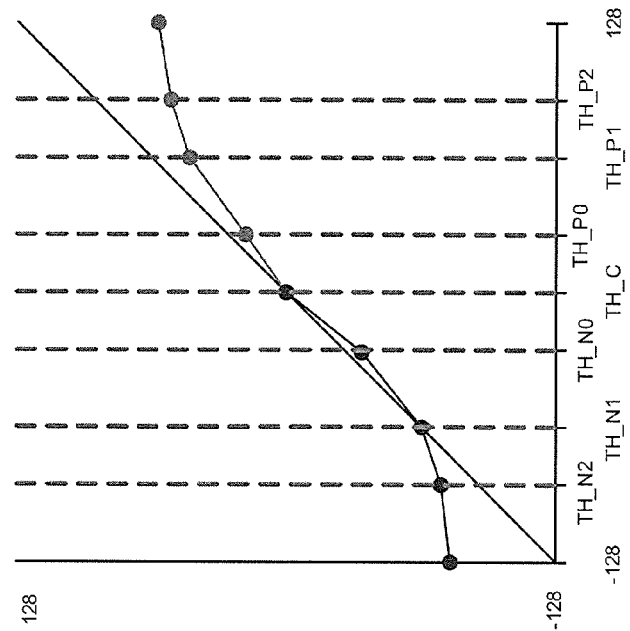
FIG. 3 shows a graph of a piecewise disparity adjustment curve.

Module 16 also adds dynamic control. The dynamic control includes a global disparity adjustment. The global disparity may be set to a customer defined position, since the original global disparity is detected in the disparity estimator. The dynamic control may also include piecewise disparity adjustment, where different gain control for different disparity values, as shown in FIG. 3. TH_C is the center of piecewise adjustment; it can be the customer defined value of global disparity. For disparities that are larger or smaller than this disparity, different gains will be used to adjust it according to its comparison with different thresholds. This can be used to adjust the 3D image to make it more palatable. In one embodiment, the pixel level disparity may convert to an unsigned 10 bits of data by adding some shifting then sent to frame interpolation 18.

Figure 4:
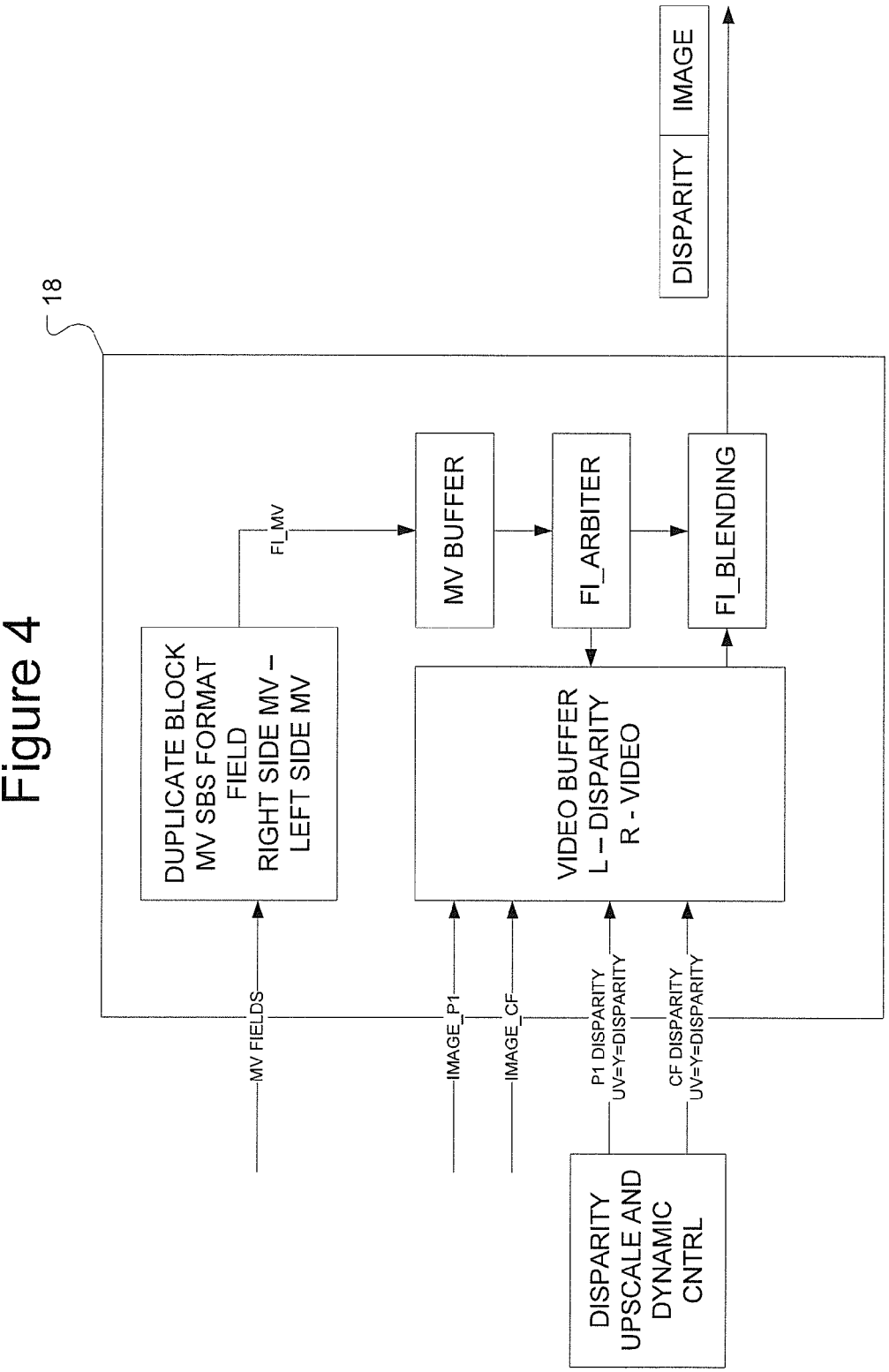
FIG. 4 shows a diagram of a disparity interpolation at a frame interpolation phase.

Frame interpolation generally produces frames between the current frames. For multi-view data the disparity at the interpolated phase FI needs to coincide with a moving object. The disparity field at the original phase, such as P1 and CF, need to do interpolation according to the motion vectors. This allows the disparity to coincide with the interpolated FI image. FIG. 4 shows a more detailed view of the frame interpolator 18. Using frame interpolation, the process uses the motion vector based disparity interpolation and image interpolation at the same time for each FI phase.

The process combines the disparity field and image into side by side formats. In one embodiment, the left side is disparity and the right side is image. For example, in a YUV image, the left side's Y component is equal to disparity and the UV component also equals disparity. Simultaneously, the FI frame motion vector field is duplicated to a side by side format. After the frame interpolation, the side by side output has the left side as disparity and the right side as image data. In one embodiment, the disparity data is 10 bits and the image is 30 bits as output.

The process also improves frame interpolation by improving occluded region detection with the disparity information. For the pixel, when CF and P1 disparity hit by MV are different, that means P1 and CF pixel should belong to different region, the side with larger disparity should be foreground, and the side with smaller disparity should be background. Frame interpolation can give more weight to pixel with smaller disparity.

Figure 5:
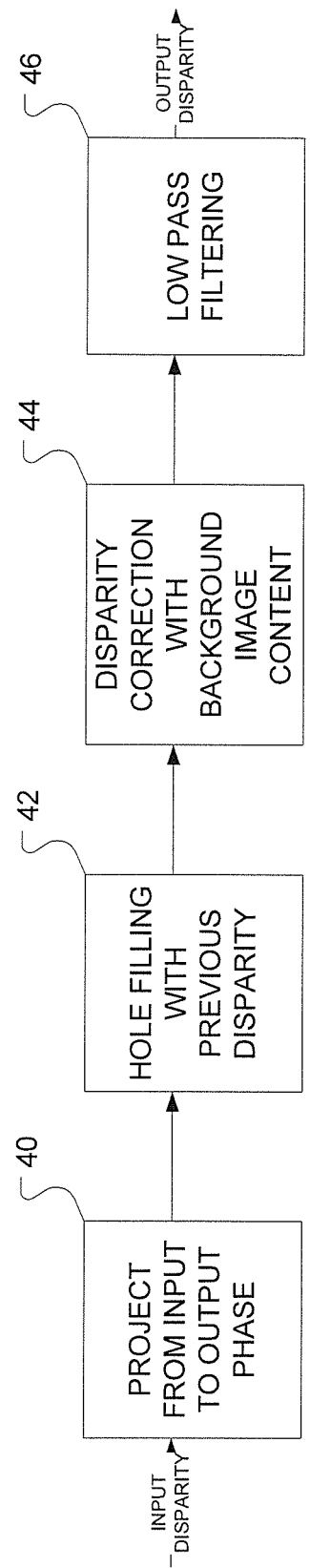
FIG. 5 shows a diagram of a disparity generation for a new view.

The process uses the disparity and image data interpolated by the frame interpolation to generate new views at the multi-view module 26. Before the generation of new views, the disparity is projected to phase of the new view to get the disparity at the output phase of the new view. FIG. 5 shows an embodiment of the disparity generation process for a new view.

Figure 6:
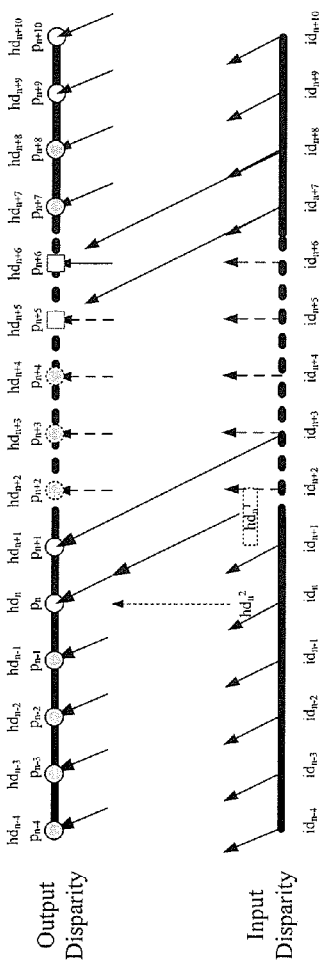
FIGS. 6-7 shows disparity projection and correction

At 40, the process performs the projection discussed above. The process projects the disparity from the input disparity to the output buffer one by one according to the disparity value and the phase value. See FIG. 6, in which arrows with dashed lines denote foreground disparity, and solid arrows denote background disparity. When an output position is hit by multiple disparities, for example, $p_{n+5}$ at the output disparity buffer was hit by disparity $id_{n+5}$ and $id_{n+7}$, the process selects the one with the largest disparity value, $id_{n+5}$, to protect the foreground, since largest disparity indicates the foreground.

Some output positions may not have a disparity, referred to here as a 'hole.' For the positions that are not hit by a disparity, the process takes the hit left disparity as its disparity at 42. For example, no disparity hit position $p_n$ and $p_{n+1}$ at output disparity buffer, then take disparity at position $p_{n-1}$, such as $hd_{n-1}$, as disparity at $p_n$ and $p_{n+1}$. When the first output position is a hole, the missing disparity can be filled in with the input disparity at corresponding position.

Disparity corrections to fill the hole should be ensured to use the background content at 44. Generally, the input image and the disparity have large disparity values for the foreground and small disparity values for background. For each output position, for example $p_n$, the process projects the selected disparity $hd_n$ back to the input disparity according to its selected disparity and its phase value, and hit a pixel with disparity $hd_n^1$. The hit disparity $hd_n^1$ is then projected back to the input disparity from the current position and its hit a pixel with disparity $hd_n^2$. For position $p_n$ at FIG. 6, $hd_n$ hit a pixel with disparity value of $id_{n+2}$ such as $hd_n^1 = id_{n+2}$, and $hd_n^2$ will equal to $id_n$.

Figure 7:
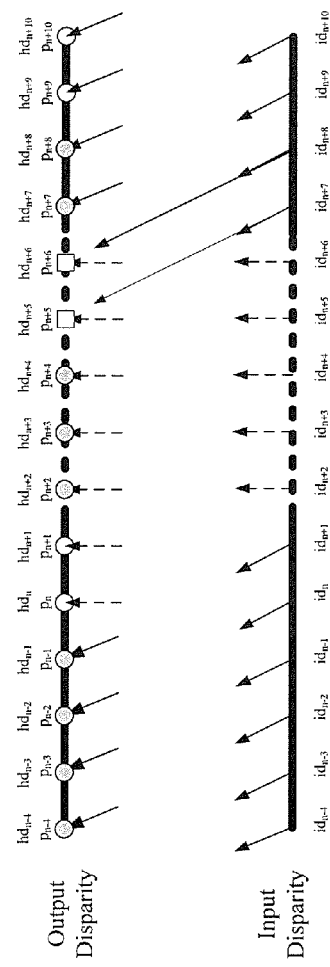

The hit disparities $hd_n^1$ and $hd_n^2$ are compared. If $hd_n^2$ is smaller than $hd_n^1$, then $hd_n^1$ is selected as the selected disparity, because it means that the hole will filled by pixel with disparity $hd_n^2$, which is a background pixel compared with the pixel with disparity $hd_n^1$. FIG. 7 shows the corrected disparity. The disparity field is then low pass filtered at 46. In one embodiment, the filtering may be performed in a 3×9 window to smooth.

For multi-views with multiple phases, for example 12 views, projection for those phases at the same time will be very complex. To save cost, the process only does disparity projection for the left farthest and right farthest view. For other views in between the zero phase and the left farthest phase, the two phases are used to do linear interpolation according to the distance to the zero phase and the left farthest phase. For views having a phase between the zero phase and the right farther phase, these phases are used for linear interpolation according to the zero phase and the right farthest phase according to the distance to the zero phase and the right farthest phase.

In this manner, disparity post processing and motion vector estimation can be used to generate and interpolate multiple views with frame interpolation.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of generating new views for a multi-view display system, comprising:
   receiving a block-based disparity image data generated by a first view of a three-dimensional scene and image data generated by a second view of the three-dimensional scene for a frame of image data at a processor, the image data of the first and second views having a first frame rate, wherein receiving the block-based disparity image includes receiving a reliability weight for each block of the disparity image data;
   determining a set of motion vectors between the frame of the image data at a point in time of the first view and at least one frame adjacent in time to the image data of the first view;
   performing temporal interpolation of the disparity image data using the set of motion vectors producing interpolated image data for new frames of image data of the first view and interpolated disparity data; and
   generating at least one new view of image data using the reliability weights for each block of disparity image data and performing a piecewise disparity adjustment at the point in time using the interpolated image data of the first view and the interpolated disparity data at an output frame rate that is higher than the first frame rate.

2. The method of claim 1, wherein the interpolated data comprises image data in one of either the left side or right side interpolated data and disparity data in the other side interpolated data.

3. The method of claim 1, wherein generating the new view comprises:
   projecting disparity to the new view;
   determining if each output position in the new view has a disparity;
   using background disparity data to provide a disparity for output positions determined not have a disparity;
   smoothing the projected disparity field; and
   using the projected disparity field and the image data to generate multiple views.

4. The method of claim 1, wherein generating at least one new view comprises generating multiple views.

5. The method of claim 4, wherein generating multiple views comprises:
   projecting disparity for a left farthest view and a right farthest view; and
   interpolating disparity fields for views between the left farthest view and the right farthest view.

6. The method of claim 5, wherein interpolating disparity fields comprises using a zero phase and a left farthest phase for fields between the zero phase and the left farthest phase, and using the zero phase and a right farthest phase for fields between the zero phase and the right farthest phase.

7. The method of claim 1, further comprising using the disparity estimation to improve occluded region detection used in the image interpolation.

8. A method of determining occluded regions in a motion compensation process, comprising:
   receiving right view image data and left view image data for a point in time at a processor;
   using the processor to perform disparity estimation between the right and left view image data to identify a set of disparities for a block of image data;
   using the processor to perform motion vector estimation between temporally separated frames of at least one of the views;
   using the disparities to identify occluded regions in one or more of the views of the image data; and
   performing motion vector based disparity interpolation on the set of disparities and image interpolation simultaneously using the occluded regions to produce left and right side interpolated image data for new frames of image data for new, additional views at the point in time.

9. The method of claim 8, further comprising generating at least one new view using left and right side interpolated data.

* * * * *